Oct. 21, 1941.　　　D. M. ANDERSON　　　2,259,984
VACUUM BREAKING VALVE
Filed Jan. 31, 1940　　　2 Sheets-Sheet 1

INVENTOR
DWIGHT M. ANDERSON
BY
*Hyde and Meyer*
ATTORNEYS

Oct. 21, 1941.                D. M. ANDERSON                2,259,984
                         VACUUM BREAKING VALVE
             Filed Jan. 31, 1940              2 Sheets-Sheet 2

INVENTOR
DWIGHT M. ANDERSON
BY Hyde and Meyer
ATTORNEYS

Patented Oct. 21, 1941

2,259,984

UNITED STATES PATENT OFFICE 2,259,984

VACUUM BREAKING VALVE

Dwight M. Anderson, Cleveland Heights, Ohio

Application January 31, 1940, Serial No. 316,620

7 Claims. (Cl. 277—60)

This invention relates to improvements in vacuum breaking valves such as are placed in the plumbing systems of buildings to prevent contamination of the water supply upon the building up of vacuum in the supply line.

The type of valve here involved should be distinguished from vent valves such as are placed between flushing valves and toilet bowls for the purpose of venting the bowl between flushing operations, as the positioning and functioning of these two types of valves are entirely different.

An object of the present invention is to provide a very simple valve which automatically admits air to the main water supply line in case a vacuum forms in that line but which normally closes off the air inlet to the line when the supply pressure is normal.

Another object of the present invention is to provide a simple vacuum breaking valve of the type described wherein the air inlet for filling the vacuum in the main water supply line is sufficiently large that no suction is created in the devices normally fed by the supply line and located beyond the valve.

Another object of the present invention is to provide a vacuum breaking valve combined with a control valve for the normal flow of liquid therethrough.

Other objects of the invention reside in the design and assembly of the parts so that they are cheaply constructed and easily assembled and dis-assembled, as will more clearly appear in the accompanying description and drawings.

Figure 1:
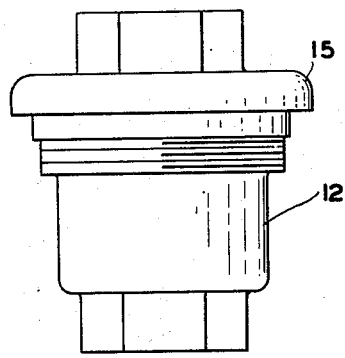
Figure 2:
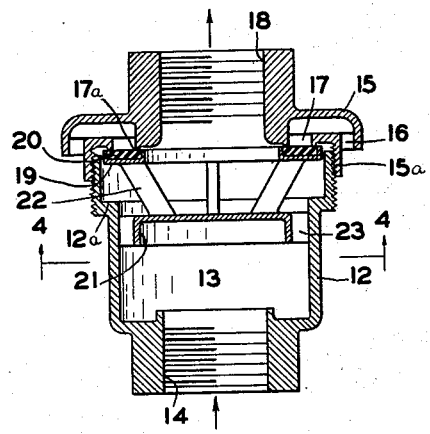
Figure 3:
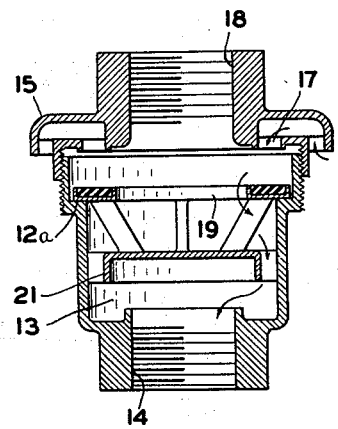
Figure 5:
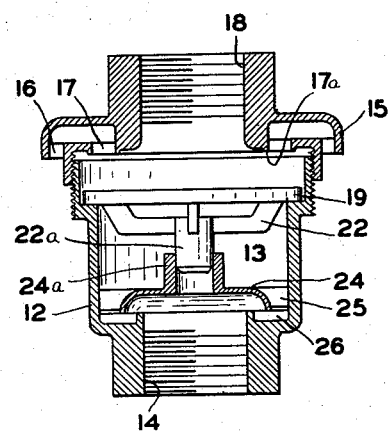
Figure 4:
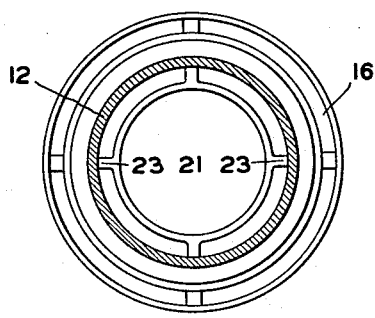
Figure 6:
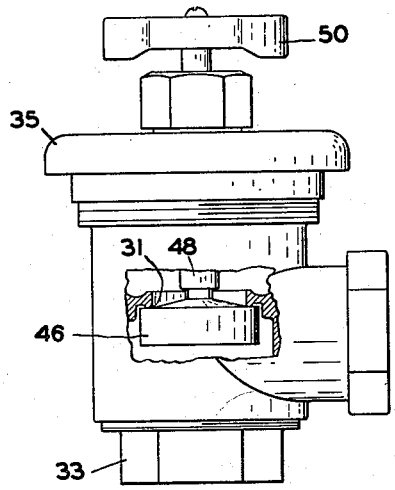
Figure 7:
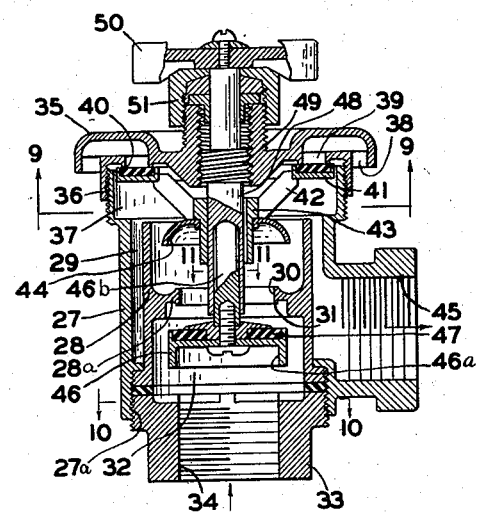
Figure 8:
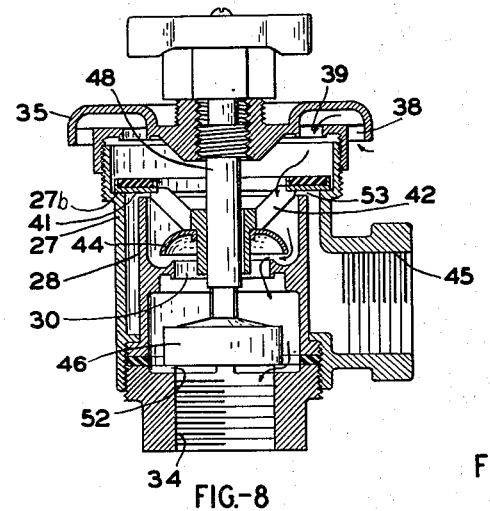
Figure 12:
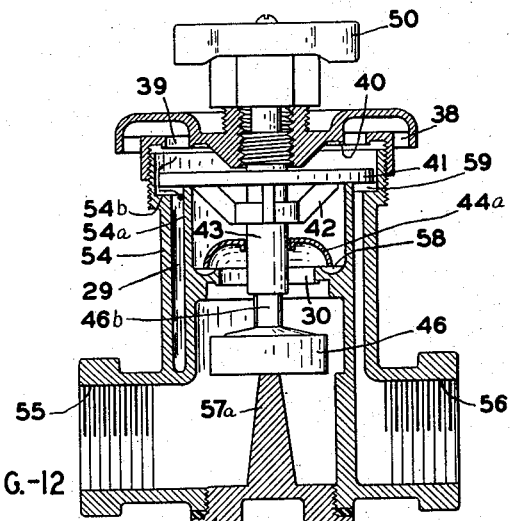
Figure 9:
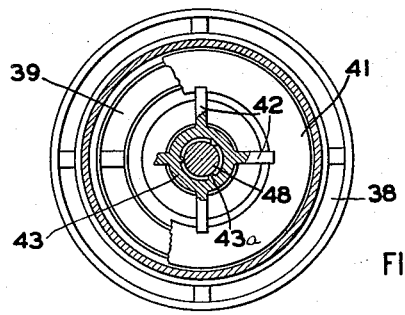
Figures 10, 11:
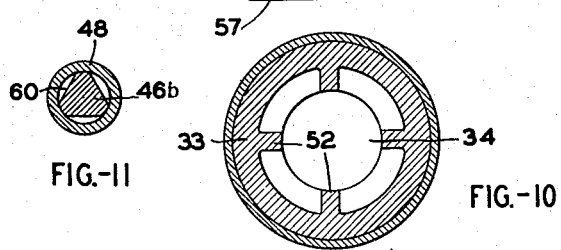

In the drawings, Figs. 1 to 4 show one modification whereof Fig. 1 shows a side elevational view, Fig. 2 shows a central section with the air valve closed, Fig. 3 shows a similar section with the air valve open and Fig. 4 shows a transverse section along the line 4—4 of Fig. 2; Fig. 5 is a modification of the first form shown in a central sectional view; Figs. 6 to 11 show another modification, Fig. 6 being a side elevational view partly broken away to show the seating of one of the valves, Fig. 7 is a central section through the device of Fig. 6 showing the air valve in closed position, Fig. 8 is a section similar to Fig. 7 showing the air valve in open position, and Figs. 9, 10 and 11 are transverse sections taken along similarly numbered lines of Fig. 7; while Fig. 12 is a central sectional view through still another modification.

Many cities have had difficulty with the contamination of their water supply because upon failure of the pressure in the main supply lines in various homes and buildings sufficient vacuum was created by the falling water level in the main supply line to suck back into the line contaminated water from devices normally supplied by the system. Various valves are known to me intended for breaking the vacuum in the main supply line when this condition exists but most of those valves fail to pass the Underwriters' tests because upon the creation of a high vacuum in the main supply line, the inrushing of air through the vacuum breaking valve creates an ejector or suction effect upon wash basins, toilet bowls and the like, normally supplied with water from the system, sufficient to cause contaminated water from those devices to be drawn back into the main supply line. My invention here disclosed breaks the vacuum in the main supply line in a very efficient manner and one which absolutely prevents the suction of contaminated water back into the lines.

A simple form of my invention is shown in Figs. 1 to 4 and comprises a main valve body 12 which provides a substantially cylindrical chamber 13 having a threaded opening 14 at the bottom for water inlet from the main supply line. The top of the valve body is closed by a cap 15 which has a threaded connection at 15a with the main part of the valve body. The cap is provided with a hollow peripheral flange providing an outer air port 16 and an inner air port 17. This inner air port terminates in a downwardly extending valve seat 17a. The cap 15 is provided with a central threaded opening 18 for water outlet from the valve body.

Within the chamber 13 is an air valve 19 carrying an annular ring 20 of the usual valve sealing material, such as rubber, composition or the like, adapted to coact with the valve seat 17a. This air valve is arranged to be automatically lifted into engagement with the valve seat 17a by a stream of liquid flowing through the inlet 14. One manner of doing this is the provision of the downwardly facing cup member 21 which is connected to the valve member 19 by the open spider arrangement 22. The valve and the cup member have free vertical movement within the chamber 13, which movement is guided by lugs 23 at the sides of the cup member. Referring to Fig. 2 it will be obvious that water coming upward through the inlet 14 will play upon the under side of the cup member and will then pass around the edges of the cup member through the annular space between the cup member 21 and the cylindrical wall of the valve body 12 and thence through the open spider 22 and through the outlet 18. This action of the incoming water will normally cause the air inlet port 17 to be closed by the valve 19. When the main water supply pressure is normal valve 19 is held tight against its seat.

Upon failure of the water supply in the pipe connected to the inlet 14, loss of pressure or the formation of a vacuum in that supply line will permit gravity to cause the valve 19 to drop to the position of Fig. 3, thus opening the air inlet port 17 so that air will pass downwardly through the opening at 14 to supply the vacuum in the inlet pipe and preventing any suction in devices connected beyond the outlet 18. To this end the area of the port 17 is greater than the area of the opening 14 so that all of the air which can pass through the opening 14 is easily supplied through the port 17.

Means is provided to limit the downward movement of valve 19 and cup member 21 so that the opening at 14 is always unobstructed. To this end the shoulder 12a is formed on the body 12 in a manner to underlie the valve 19 in the position of Fig. 3 thus holding the cup member 21 above the outlet 14.

It will be noted that access to the valve 19 is facilitated by making the threaded connection at 15a sufficiently large that upon removal of the cap 15 the valve 19 and its associated cup member may be lifted out of the valve body.

The modification of Fig. 5 is similar in all respects to that just described except that the cup member here designated 24 is not rigidly connected with the valve member 19 and its spider 22 but instead the spider is provided with a centrally located downwardly projecting cylindrical shaft 22a and the cup member has a sleeve 24a which slides longitudinally of the shaft 22a. It results from this construction that the incoming water first moves the cup member 24 upwardly and then the cup member engages the valve member and lifts it into engagement with the valve seat 17a. The cup member has the guiding lugs 25 engaging the walls of chamber 13 and means is provided to prevent the cup member from sealing off the opening 14. To this end spaced ribs 26 are provided in the bottom of chamber 13 which engage the peripheral edge of cup member 24 in its lowermost position, thus leaving an open passageway around the lip of the cup.

In the modification of Figs. 6 to 11, the air valve of the first modification is combined with a water valve for controlling the flow of water through the vacuum breaking valve. The structure provided for this purpose may take a number of different forms. The embodiment shown in Figs. 6 to 11 comprises a substantially cylindrical outer wall 27 having a threaded opening 27a at the bottom. Threaded into this opening is a sleeve 28 providing an inner cylindrical wall parallel to and spaced from the wall 27 leaving an outer annular chamber 29. By proper design the walls 27 and 28 might be part of the same casting. Intermediate the ends of the sleeve 28 is provided a partition wall 28a having a centrally located port 30 with a downwardly facing valve seat 31. Below the valve seat is a lower inner chamber 32 which is closed at the bottom by the plug 33 which is threaded into the threaded connection 27a and provided with a centrally located threaded opening 34 for attachment to the main water supply pipe. A top cap member 35 has a threaded connection with the valve body at 36 and closes off the valve body to form a top chamber 37. The cap member is hollow, similar to the cap member 15 previously described so as to provide an outer air inlet port 38 and an inner air inlet port 39 which terminates in the downwardly facing annular valve seat 40. An air valve 41 located in the top chamber 37 coacts with the valve seat 40 to control the flow of air into the valve body. This valve member 41 is connected by an open spider construction 42 with a central sleeve 43 to which is secured either rigidly or by a press fit a cup member 44. The cup member faces downwardly over the port 30 so that inrushing water strikes the cup member and then passes around the peripheral edge of the cup so as to cause the valve member 41 to engage the valve seat 40 to close off the air inlet 39. The cylindrical wall 27 is provided with a liquid outlet at 45 and the normal flow of water is through the inlet 34 through port 30, past the cup member in the upper inner chamber, then through the top chamber and the annular chamber 29 to the outlet 45.

The means for controlling the flow of water through the port 30 comprises a valve member 46 which carries on its upper surface a ring 47 of sealing material adapted to engage the valve seat 31 when the valve is in its uppermost position. The valve is positioned directly over the liquid inlet 34 so that the tendency of that liquid would be to normally press the valve toward closed position. To enhance this effect the valve is provided with a downwardly facing cup portion 46a. The valve has a centrally located upwardly extending projection 46b by which the valve is guided. A control stem 48 is provided having a hollow lower end into which the guide stem 46b slidingly fits. The stem 48 has a threaded connection at 49 with the cap 35. A valve handle 50 is rigidly secured to the upper end of the stem 48. The usual packing gland construction 51 seals the stem 48 in the cap 35.

It will be noted that the central spider portion 43 which guides the valve 41 and the cup member 44 have a sliding mounting on the stem 48. To reduce the friction and tendency to bind at this point, I provide a plurality of spaced vertical ribs 43a, preferably three, on the inner wall of sleeve 43 and engaging the stem 48 as shown in Fig. 9. To reduce the friction between projection 46b and the recess in stem 48, I may flatten the sides of 46b in a triangular fashion as shown at 60 in Fig. 11.

When there is full pressure in the main supply line connected at 34, the valve 46 is in closed position shown in Fig. 6 if stem 48 is in its upper position. This valve is opened by screwing down on the stem 48 by manipulation of the valve wheel 50 so as to move the valve 46 away from the valve seat 31. This permits the normal flow of water through the device as previously described to the outlet 45. This normal flow raises the cup member 44 and the valve member 41 to the position of Fig. 7, thus closing off the air inlet 39.

Upon failure of the supply so as to reduce the pressure or produce a vacuum in the main supply line, the cup member 44 and the valve members 41 and 46 fall by the action of gravity to the position of Fig. 8. This occurs whether valve 46 is in the position of Fig. 6 or of Fig. 7. Air then enters as shown by the arrows of Fig. 8 through the inlet ports 38 and 39, then through the open spider construction 42, around the edge of the cup member 44, through the port 30, through the lower inner chamber and beneath valve 46 to the opening 34 where it passes into the main supply pipe to break the vacuum. It will be noted that spaced ribs 52 are provided beneath the valve 46 in Fig. 8 so as to insure the passage of air into the opening 34.

It will be noted in Figs. 7 and 8 that the wall 27 provides a shoulder 27b which limits the downward movement of the valve member 41 and the cup member 44 and it will be noted also that the wall 28 stops short of the shoulder 27b so as to provide an opening 53 for the venting of any devices connected to the outlet 45. Air entering chamber 29 at 53 will permit any device connected to 45 to drain toward an open outlet.

The area of the air inlet ports 38 and 39 is at least equal to and preferably greater than the area of the opening 34 so that all of the air demanded in the main supply pipe is readily supplied through the air inlet ports; also the openings through the spider 42 are sufficiently large to supply all of the air demanded by the vacuum in the main supply pipe so that there is no tendency to create a suction at the point 53. I prefer to make the air passageway beneath valve 46 in Fig. 8 less than the passageway beneath cup 44 which in turn is less than the passageway through spider 42, which in turn is less than the area of port 39. This avoids pulsation because I provide a reservoir of air on the inlet side of each restricted passageway sufficient to supply the flow demand through that passageway.

The device of Figs. 6 to 11 is cheaply constructed and readily assembled and disassembled. It will be noted that the plug 33 is sufficiently large so that its removal permits the removal of the valve 46 from the valve body; also the opening in the top cap 35 at 36 is sufficient when the cap is removed to permit the removal of the air valve and the cap member from the valve body. Obviously the valve stem 48 may be entirely removed from the cap 35 by means of the threaded connection 49.

The modification of Fig. 12 is generally similar to that of Figs. 6 to 11 with the following exceptions. One casting provides the outer wall 54, the inner wall 54a, the inlet 55 and the outlet 56. The valve 46 is limited in its downward movement by a central post 57a which is part of the cap 57 closing the opening in the bottom of the valve body. This bottom opening is large enough to permit the removal of valve 46 therethrough. The cup member 44a is slidably mounted upon the member 43 in the fashion similar to the arrangement between the parts 22a and 24a previously described in Fig. 5. To prevent the closing of port 30 by the cup member 44a, spaced ribs 58 are provided to receive the periphery of the cup in its lowermost position as shown in Fig. 12. It will be noted that the wall 54a extends above the shoulder 54b so that the air passageway as shown by the arrow in Fig. 12 is around the periphery of the valve member 41 into the annular chamber 29. With these differences the valve of Fig. 12 functions almost exactly the same as the valve of Figs. 6 to 11, with the exception that the cup member 44a rises part way before engaging the spider 42 to lift the valve member 41 against the valve seat 40.

If one does not desire to vent the devices connected at 45 or 56, then the opening at 53 in Fig. 8 or at 59 in Fig. 12 may be done away with by making the shoulder 27b and the top of wall 28 stop at the same level in the case of Fig. 8, or shoulder 54b and wall 54a in the case of Fig. 12. In either case the valve member 41 would then substantially seal the annular opening directly beneath the valve member in its lowermost position.

While in Figs. 6 to 12 I have shown the water control valve 46 on the water inlet side of air control valve 41, I think it is obvious to those skilled in this art that the valve 46 could be beyond or above the valve 41. For instance, in Figs. 1 to 5, the water valve seat and valve could be located above the opening 18.

What I claim is:

1. Vacuum breaking valve structure comprising a hollow body having a liquid inlet passageway and having a liquid outlet passageway, said body having an air inlet arranged annularly about one of said passageways and terminating in a valve seat, said air inlet being at least equal in area to said liquid inlet, valve means freely movable vertically in said body and comprising an annular valve member adapted to coact with said valve seat to open and close said air inlet, said valve means comprising a downwardly facing cup member, means operatively connecting said cup member and said valve member, said last named means providing a passageway for liquid flow from said liquid inlet to said outlet, and there being open communication between said air inlet and said liquid inlet when said valve is in open position.

2. In a valve structure, a body having a liquid inlet and a liquid outlet, a valve seat formed between said inlet and outlet, a valve on the inlet side of said valve seat cooperable therewith to control the flow of fluid through said body, said valve being so located with respect to said inlet that inward flow of liquid through said inlet urges said valve toward its seat, there being an open and substantially unrestricted passage between said inlet and said valve, said body having an air inlet terminating in a valve seat, a valve located within said body and cooperable with said last named valve seat to control the flow of air into said body, means operatively connected with said second named valve and responsive to inward liquid flow through said first named valve for moving said second named valve to closed position, there being free communication through said body between said air inlet and said first named valve, and means for moving said first named valve away from its seat, said last named means including a part operatively connected with said second named valve for guiding the latter in its movement.

3. In a valve structure, a body having a liquid inlet and a liquid outlet, a valve seat formed between said inlet and outlet, a valve on the inlet side of said valve seat cooperable therewith to control the flow of fluid through said body, said valve being so located with respect to said inlet that inward flow of liquid through said inlet urges said valve toward its seat, there being an open and substantially unrestricted passage between said inlet and said valve, said body having an air inlet terminating in a valve seat, a valve located within said body and cooperable with said last named valve seat to control the flow of air into said body, means operatively connected with said second named valve and responsive to inward liquid flow through said first named valve for moving said second named valve to closed position, there being free communication through said body between said air inlet and said first named valve, and means for moving said first named valve away from its seat, said last named means including an elongated stem associated with said second named valve in guiding relationship, and said first named valve including a part slidable longitudinally of said stem.

4. In a valve structure, a body having a liquid inlet and a liquid outlet, a circular valve seat formed between said inlet and outlet, a circular valve on the inlet side of said valve seat cooperable therewith to control the flow of fluid through said body, said valve being so located with respect to said inlet that inward flow of liquid through said inlet urges said valve toward its seat, said body having an air inlet located on the outlet side of said valve seat, said air inlet terminating in a valve seat facing toward said first named valve, a second valve within said body and cooperable with said last named valve seat to control the flow of air into said body, said second valve being axially concentric with said first named valve seat, there being free communication through said body between said air inlet and said first named valve, a cup-shape member operatively connected with said second named valve and responsive to inward liquid flow through said first named valve for moving said second named valve to closed position, a valve stem operatively connected with said first named valve and extending outside of said body, said stem being positioned axially of both of said valve seats, and said second valve and said cup-shape member being mounted axially upon said stem for sliding movement therealong.

5. In a valve structure, a body having a liquid inlet and a liquid outlet, a downwardly facing circular valve seat formed between said inlet and outlet, a circular valve on the inlet side of said valve seat and cooperable therewith to control the flow of fluid through said body, said valve having an upwardly extending guide stem, said valve having a downwardly facing cup in the path of liquid entering through said inlet whereby to urge said valve toward its seat, said body having an air inlet located above said valve and terminating in a downwardly facing valve seat substantially annular in form and axially concentric with said first named valve seat, a second valve located in said body below said second named valve seat and freely movable vertically into and out of position against said second named valve seat to control the flow of air into said body, a cup-shape member facing downwardly above said first named valve and operatively connected with said second valve to lift it by inward flow of liquid through said first named valve, a control stem for said first named valve located axially of said valve seats and passing outside said body, said control stem at its lower end slidingly embracing said guide stem, means preventing said first named valve from closing said liquid inlet, said second valve being annular in form and supported by an open spider member, and said spider member and cup-shape member being mounted axially upon said control stem for sliding movement therealong.

6. In a valve structure, a body having a vertical substantially cylindrical outer wall, an inner cylindrical wall spaced from said outer wall and connected therewith to provide an outer annular chamber and an inner chamber, said inner wall ending short of the upper end of said outer wall and there providing a top chamber, a liquid valve port having a downwardly facing valve seat and providing lower and upper inner chambers, a liquid inlet communicating with said lower inner chamber, a liquid outlet communicating with said outer chamber, a liquid control valve in said inner lower chamber and cooperable with said valve seat, a threaded bottom member closing the bottom of said lower chamber and being of a size to permit the removal of said valve from said body upon removal of said threaded member, a threaded top member closing the top of said top chamber and carrying an air inlet port having a downwardly facing valve seat, an air control valve in said top chamber freely movable vertically and cooperating with said last named valve seat to open and close said air inlet port, said threaded top member being of a size to permit the removal of said air control valve from said body upon removal of said threaded top member, a downwardly facing cup member in said inner upper chamber, said cup member having an operative connection with said air control valve to lift the latter into engagement with its seat by flow of liquid upwardly in said inner chamber, said air control valve engaging at least one of said cylindrical walls to limit the open position of said air valve, and a valve stem located centrally of said inner and top chambers and having a lost motion connection with said liquid control valve.

7. Vacuum breaking valve structure comprising a body having a liquid inlet and a liquid outlet, a valve seat formed between said inlet and outlet, water valve means on the inlet side of said valve seat cooperable therewith to control the flow of water through said body, said valve means being so located with respect to said inlet that inward flow of liquid through said inlet urges said valve means toward its seat, said body having an air inlet located on the outlet side of said water valve means, air valve means located within said body and cooperable with said air inlet to control the flow of air into said body, there being passageways for the flow of air past both of said valve means in their open positions, said passageway past said water valve means being of less sectional area than said passageway past said air valve means, and said passageway past said air valve means being of less sectional area than said air inlet.

DWIGHT M. ANDERSON.